(12) United States Patent
Abdali Mashhadi et al.

(10) Patent No.: US 12,461,042 B2
(45) Date of Patent: Nov. 4, 2025

(54) AUTOMATIC MAVERICK WAFER SCREENING USING DIE PASS PATTERN

(71) Applicant: Infineon Technologies Canada Inc., Ottawa (CA)

(72) Inventors: Iman Abdali Mashhadi, Kanata (CA); Regina Inyangat Akudo, Kanata (CA); Syed Faizan-ul-Haq Gilani, Stittsville (CA)

(73) Assignee: Infineon Technologies Canada Inc., Ottawa (CA)

( * ) Notice: Subject to any disclaimer, the term of this patent is extended or adjusted under 35 U.S.C. 154(b) by 168 days.

(21) Appl. No.: 18/521,732

(22) Filed: Nov. 28, 2023

(65) Prior Publication Data

US 2025/0172503 A1    May 29, 2025

(51) Int. Cl.
| | | |
|---|---|---|
| *G01N 21/95* | (2006.01) | |
| *G01N 21/88* | (2006.01) | |
| *G01N 21/956* | (2006.01) | |
| *H01L 21/66* | (2006.01) | |

(52) U.S. Cl.
CPC ..... *G01N 21/9501* (2013.01); *G01N 21/8851* (2013.01); *G01N 21/95607* (2013.01); *H01L 22/12* (2013.01)

(58) Field of Classification Search
CPC .......... G01N 21/9501; G01N 21/8851; G01N 21/95607; H01L 22/12
See application file for complete search history.

(56) References Cited

U.S. PATENT DOCUMENTS

2017/0192411 A1*    7/2017    Ghadar .................. G06N 20/00

* cited by examiner

*Primary Examiner* — Kevin K Pyo
*Assistant Examiner* — Don J Williams
(74) *Attorney, Agent, or Firm* — WORKMAN NYDEGGER (57) ABSTRACT

Automatic maverick screening of a subject wafer. An inspection pass status is acquired for each of multiple die on a subject wafer. For each of multiple zones of the subject wafer, a pass/fail percentage of the dies within the corresponding zone is compared with an expected pass/fail percentage for the corresponding zone. This expected pass/fail percentage is dependent on a history of pass/fail percentages for previous dies at a same corresponding zone for previously screened wafers. This comparison results in a deviation between the measured pass/fail percentage of the corresponding zone and the expected pass/fail percentage of the corresponding zone. Then, the subject wafer is automatically identified as a maverick wafer if the deviation of a predetermined number or more of the multiple zones falls outside of a corresponding deviation tolerance.

20 Claims, 5 Drawing Sheets

AUTOMATIC MAVERICK WAFER SCREENING USING DIE PASS PATTERN

BACKGROUND

Integrated circuits are often manufactured by performing a series of processing steps on a semiconductor wafer. The wafer is a thin flat disc of semiconductor material, most commonly silicon. The wafer undergoes several processing steps where various electronic circuits are formed on the surface of the wafer. Each integrated circuit is manufactured in a dedicated area of the semiconductor wafer in a grid pattern. Once the wafer is fully processed with an integrated circuit formed in each dedicated area of the grid pattern, the semiconductor wafer is diced along the grid pattern into constituent die. Such a die is often termed as a "chip". Each die on the wafer typically has the same electronic circuit, and the wafer can contain from just a few dies to thousands of dies, depending on the size of the wafer and the size of each die.

After dicing, each die is often tested to ensure functionality. Dies that fail the test are marked and discarded. Testing may occur prior to dicing (called "wafer-level testing") and some testing may occur after dicing (called "chip-level testing"). In any case, functional dies are then packaged to protect them and to provide connections (usually through pins or solder balls) to external devices or circuits. Testing performed on the package as a whole is referred to as "package-level testing". Functional packages can be mounted on circuit boards and used in a wide array of electronic devices.

There are sometimes instances in which something unexpected occurred while processing a wafer, which will result in the wafer being considered as an outlier that varies too far from specification. Such a wafer is often termed a "maverick wafer". For instance, perhaps an unexpected environment was encountered, or perhaps a processing machine malfunctioned. Accordingly, maverick screening is often performed to identify maverick wafers and to thereafter determine what adjustments or corrections can be made in the manufacturing process or environment to correct the manufacturing issues. Furthermore, the maverick wafer may be processed uniquely by for example, discarding the wafer entirely, or perhaps more conservatively selecting die to discard.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein allow maverick screening to be performed automatically. Thus, maverick wafers may be detected earlier since manual intervention is not required, or at the very least the automatic screening considerably reduces the amount of manual intervention. This identified maverick wafer may then be further evaluated to make earlier corrections to the manufacturing process.

Specifically, an inspection pass status is acquired for each of a plurality of die on a subject wafer. Then, for each of multiple zones of the subject wafer, a pass percentage of the dies within the corresponding zone is compared with an expected pass percentage for the corresponding zone. This expected pass percentage is dependent on a history of pass percentages for previous dies in the same corresponding zone for previously screened wafers. As an example, if the zones were concentric zones, for the innermost zone, the pass percentage of the subject wafer may be compared with the median of the pass percentage of the innermost zone for the most previously screened wafers.

This comparison results in a deviation between the measured pass percentage of the corresponding zone and the expected pass percentage of the corresponding zone. Then, the subject wafer is automatically identified as a maverick wafer if the deviation for a predetermined number (e.g., one) or more of the multiple zones falls outside of a corresponding deviation tolerance for the respective zone. As an example, in the case of concentric zones, for the innermost zone, the deviation tolerance may be proportional to (e.g., three times or six times) a standard deviation of the pass percentage of the innermost zone for the most previously screened wafers. The same process may be performed using fail percentages instead of pass percentages.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The principles described herein allow maverick screening to be performed automatically. Thus, maverick wafers may be detected earlier since manual intervention is not required, or at the very least the automatic screening considerably reduces the amount of manual intervention. This identified maverick wafer may then be further evaluated to make earlier corrections to the manufacturing process.

Specifically, an inspection pass status is acquired for each of a plurality of die on a subject wafer. Then, for each of multiple zones of the subject wafer, a pass percentage of the dies within the corresponding zone is compared with an expected pass percentage for the corresponding zone. This expected pass percentage is dependent on a history of pass percentages for previous dies in the same corresponding zone for previously screened wafers. As an example, if the zones were concentric zones, for the innermost zone, the pass percentage of the innermost zone of the subject wafer may be compared with the median of the pass percentage of the innermost zone for the most previously screened wafers.

This comparison results in a deviation between the measured pass percentage of the corresponding zone and the expected pass percentage of the corresponding zone. Then, the subject wafer is automatically identified as a maverick wafer if the deviation for a predetermined number (e.g., one) or more of the multiple zones falls outside of a corresponding deviation tolerance for the respective zone. As an example, in the case of concentric zones, for the innermost zone, the deviation tolerance may be proportional to (e.g., three times or six times) a standard deviation of the pass percentage of the innermost zone for the most previously screened wafers. The same process may be performed using fail percentages instead of pass percentages.

Figure 1:
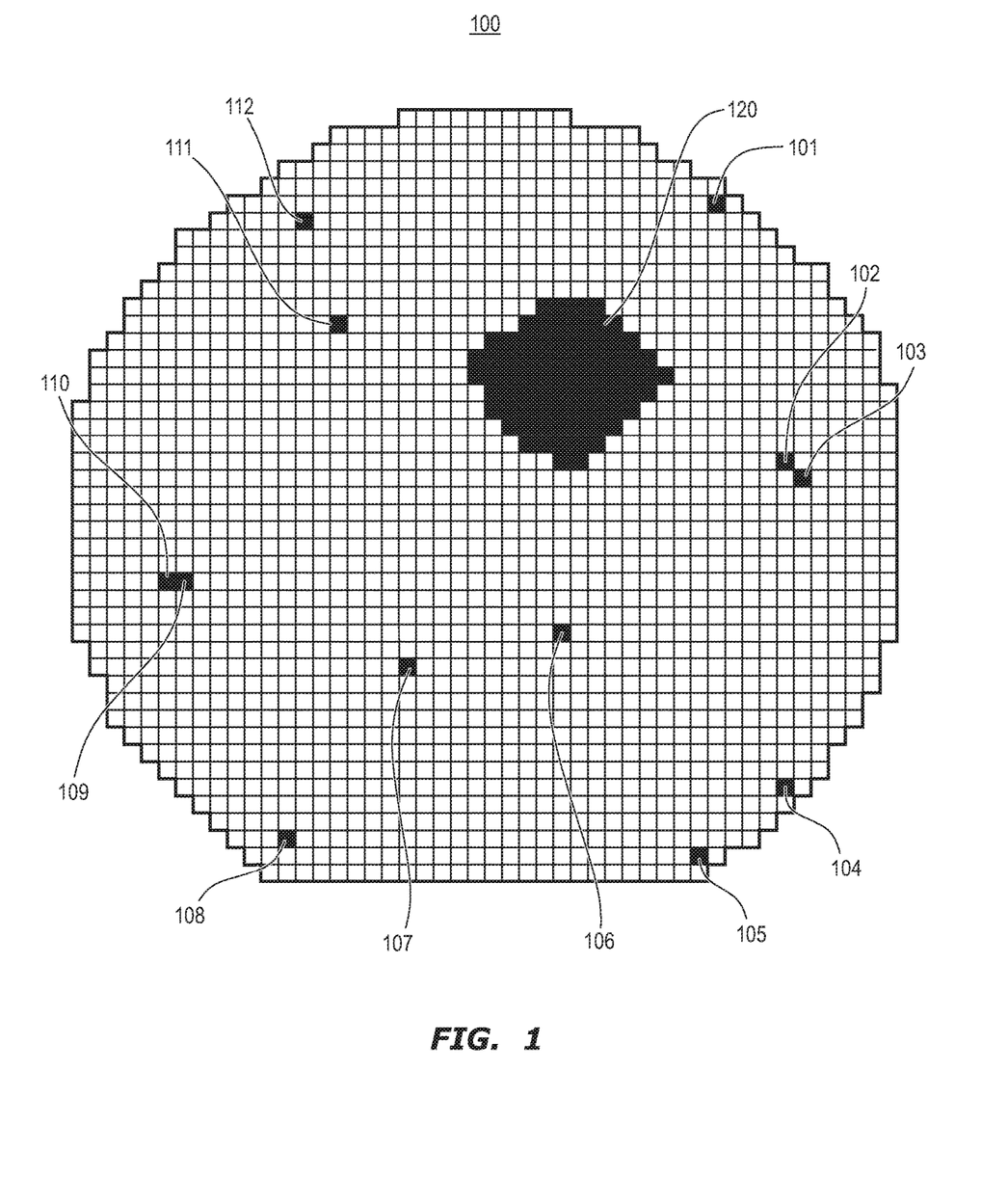
FIG. 1 illustrates an example wafer die grid where each square in the grid represents a die location, with dark squares representing positions of dies that failed inspection, and light squares representing positions of dies that passed inspection.

FIG. 1 illustrates an example wafer die grid 100 where each square in the grid represents a die location. In this particular example, a light square represents a die that passed inspection, whereas a dark square represents a die that failed inspection. Herein, the term "die" is used to refer to a region on the semiconductor wafer that includes circuitry. Later, each die will be separated by a dicing process into individual die. As a general rule, if the die passed inspection, after separated via dicing, the die will typically be packaged as appropriate. If the die failed inspection, the die will be discarded after dicing.

In FIG. 1, there are several die that failed inspection. Some of the failed die are scattered throughout the wafer and not within a cluster. However, other failed die are clustered together. For instance, failed die that are scattered throughout the wafer include twelve failed die 101 through 112 in this particular example. On the other hand, cluster 120 includes a cluster of many failed die that are each contiguous to each other on the wafer. This clustering of failed die is indicative of a high risk that something went wrong during the processing of the wafer on which the die grid 100 appears. The wafer die grid 100 will be used as an example throughout this description. The principles described herein may be used to identify suspected maverick wafers automatically. In one embodiment, this is done by evaluating inspection pass status for each of multiple zones of the wafer.

Figure 2:
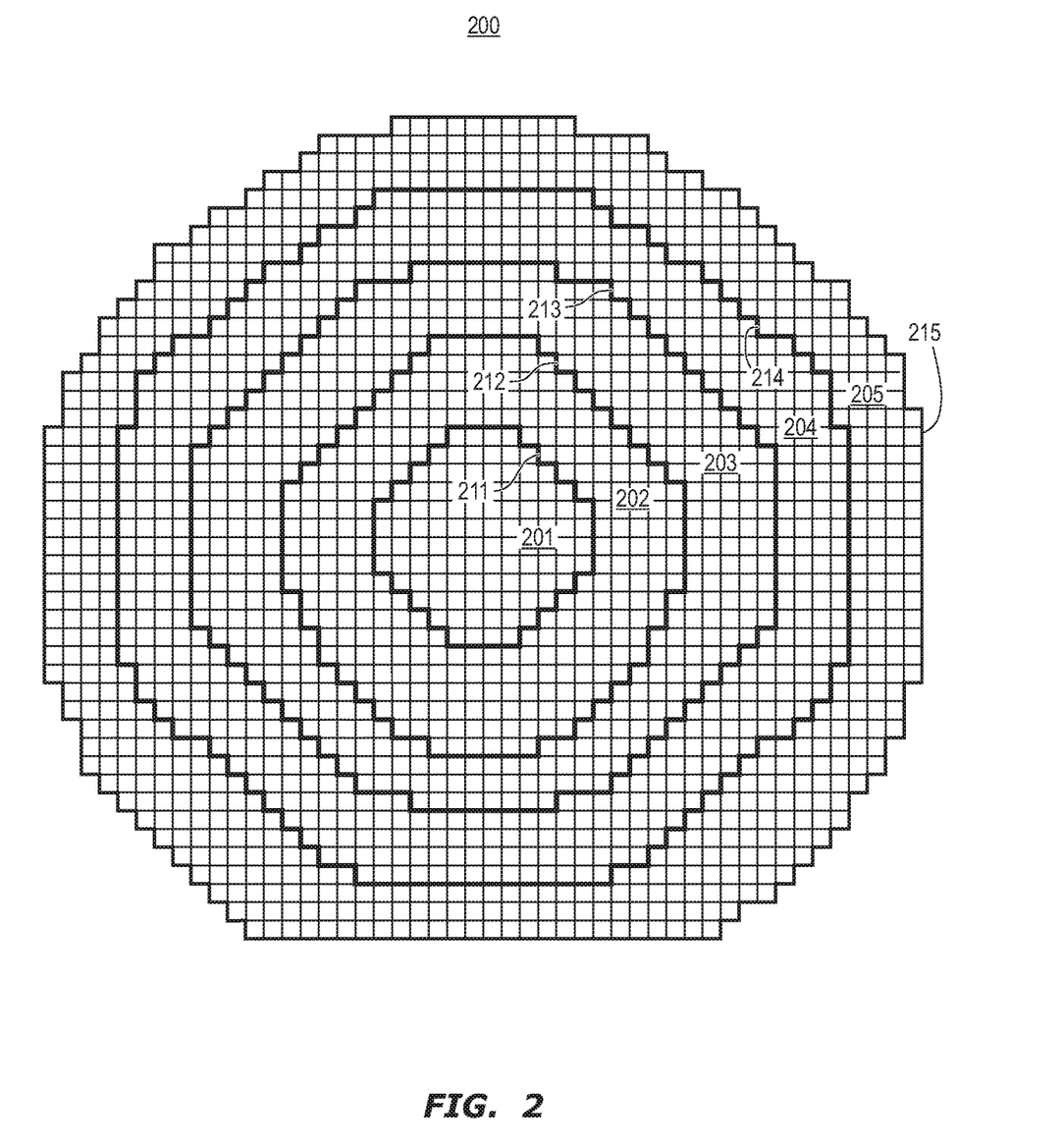
FIG. 2 illustrates a plan view of a zone mapping of multiple concentric zones mapped onto a die grid.

FIG. 2 illustrates a plan view of a zone mapping 200 of multiple zones 201 through 205 mapped onto a die grid. The principles described herein are not limited to the shape of the zones into which die are mapped. However, in the case of FIG. 2, the zones 201 through 205 are concentric zones. For instance, zones 202 through 205 are roughly the shape of a ring where the center of the ring lies within the innermost zone 201. The zone 201 includes all die within the boundary 211, the zone 202 includes all die between boundaries 211 and 212, the zone 203 includes all die between boundaries 212 and 213, the zone 204 includes all die between boundaries 213 and 214, and the zone 205 includes all die between boundaries 214 and 215.

Although the term "concentric zone" will be described hereinafter with respect to the grid mapping, the principles described herein may apply to any zone that each map to include multiple die positions. It is preferable however, that the number of die positions mapped to a zone be significant enough that an accurate formulation of an expected pass percentage may be obtained from a median of pass percentages of that zone in prior wafers that were subject to maverick screening. As an example, the number of die within each zone may be ten or more, and may in some cases be one hundred or more.

The term "concentric zones" when used herein refers to there being an innermost zone that encompasses the center of the wafer, and that there being further zones that surround the preceding zone. For instance, in FIG. 2, zone 201 encompasses the center position of the wafer, zone 202 surrounds zone 201, zone 203 surrounds zone 202, zone 204 surrounds zone 203, and zone 205 surrounds zone 204. Accordingly, each of the zones 201 through 205 may be considered "concentric zones" as the term is used herein. In FIG. 2, there are five concentric zones. However, there may be any number of zones, including two or more, three or more, four or more, five or more, and so forth.

The zone mapping 200 shows the zones 201 through 205 mapped onto a grid. For instance, the zone mapping 200 may map zones 201 through 205 to the die grid 100 of FIG. 1 so as to ascertain which die is within which zone. Of course, the die grid 100 and the zone mapping 200 need not be visualized to a user in order for the computing system to automatically identify which zone a die is within. This can be ascertained by the computing system merely from a position identifier of each die, and a zone definition of each zone. However, the die grid 100 of FIG. 1 and the grid mapping 200 of FIG. 2 are illustrated to the reader for better understanding.

Figure 3:
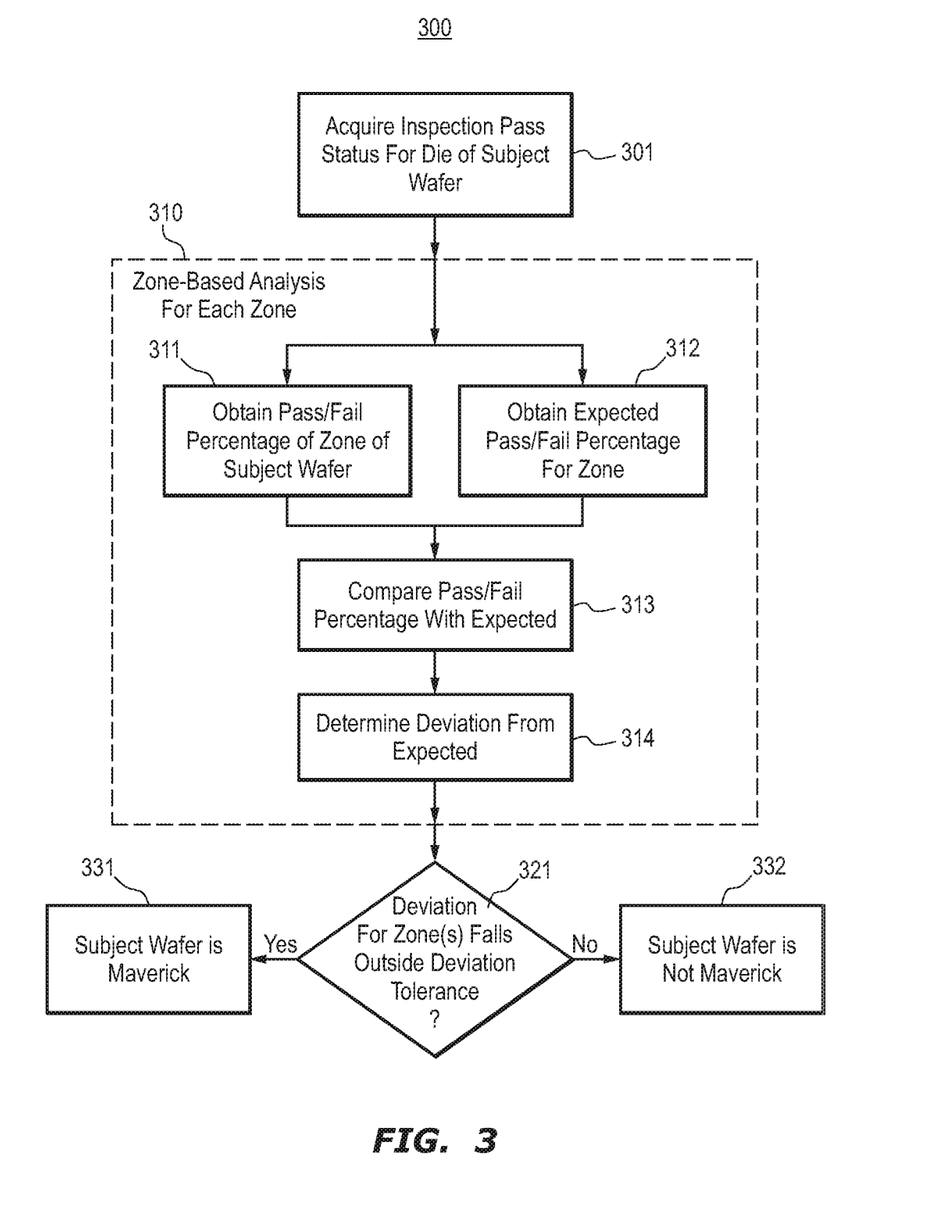
FIG. 3 illustrates a flowchart of a method for automatically performing maverick screening of a semiconductor wafer, in accordance with the principles described herein.

FIG. 3 illustrates a flowchart of a method 300 for automatically performing maverick screening of a semiconductor wafer, in accordance with the principles described herein. The method 300 will be described with frequent reference to the die grid 100 of FIG. 1, and the zone mapping 200 of FIG. 2. The method 300 may be performed by a computing system, such as the computing system 500 described below with respect to FIG. 5.

The method 300 includes acquiring an inspection pass status for each of multiple die on a subject wafer (act 301). For example, the computing system may acquire the inspection pass status for each of the die in the die grid 100 of the subject wafer. Thus, in this example, the computing system has information representing that dies 101 through 112 and all die within the cluster 120 have a pass status of fail, and the remainder of the die have a pass status of pass. Because the computing system knows the position of the die that were subject to the inspection, the die grid 100 is an example of the inspection pass status for the die of the subject wafer.

While the inspection pass status may be acquired for all of the multiple die on the subject wafer, the inspection pass status may alternatively be acquired for less than all of the multiple die on the subject wafer. However, typical wafer-level testing, when performed, is performed on all of the die on a subject wafer (excepting perhaps an exclusion zone on the periphery of the wafer). The principles described herein apply regardless of the tests that are performed on the die, regardless of whether or not there is an exclusion zone, and regardless of whether all of the die that are outside of the exclusion zone are tested. The principles described herein do not require a change in how dies are tested, and apply just as well to any future methods for testing a die.

In acquiring the inspection pass status (act 301), the computing system performing the method 300 may acquire the pass status for the various die from another computing system. Alternatively, or in addition, the computing system may acquire the pass status from one or more other computing systems that formulated the pass status of the multiple die of the subject wafer. Alternatively, or in addition, the computing system performing the method 300 may acquire the pass status by itself performing wafer-level testing of the die on the subject wafer. Alternatively, or in addition, the computing system may gather results of various tests from other computing systems, and make a determination as to whether the pass status is pass or fail.

Then, for each of the multiple zones of the subject wafer, a zone-based analysis (act 310) is performed. That is, a pass or fail percentage is obtained for each tested die that is within the corresponding zone of the subject wafer (act 311) that is being evaluated to determine whether the subject wafer is a maverick or not. For instance, the computing system may determine a pass percentage for all of the die of the die grid 100 that are within the zone 201, another pass percentage for all of the die of the die grid that are within the zone 202, another pass percentage for all of the die of the die grid that are within the zone 203, another pass percentage for all of the die of the die grid that are within the zone 204, and another pass percentage for all of the die of the die grid that are within the zone 205.

Figure 4:
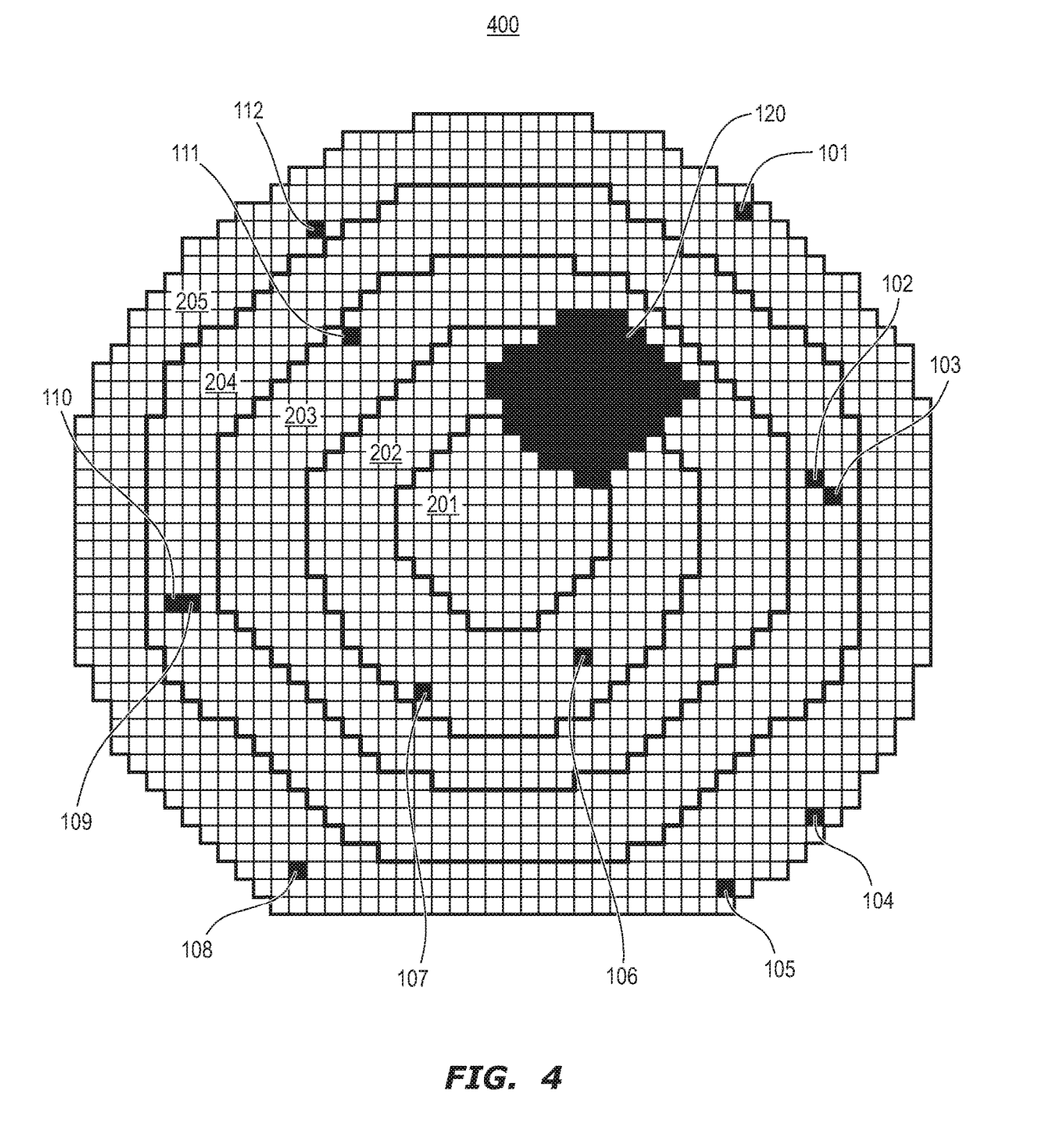
FIG. 4 illustrates a grid mapping in which the die grid of FIG. 1 is superimposed on the zone mapping of FIG. 2.

FIG. 4 illustrates a grid mapping 400 in which the die grid 100 of FIG. 1 is superimposed on the zone mapping 200 of FIG. 2. Here, it can be seen more clearly that the cluster 120 of failed die extends across the zone 202 and into the zones 201 and 203. Accordingly, in this example, the pass percentage for zone 202 would be quite low, whereas the pass percentage of zones 201 and 203 may be moderately low. On the other hand, the pass percentage for zones 204 and 205 may be close to expected. However, to verify whether the pass percentage is outside of the norm, the pass percentage is compared to an expected pass percentage.

For instance, if the zone-based analysis uses a pass percentage, an expected pass percentage is acquired for the corresponding zone (act 312). For instance, the computing system may obtain expected pass percentages for each of the zones 201 through 205 of the zone mapping 200. These expected pass percentages depend on a history of pass percentages for previous dies in a same corresponding zone for previously screened wafers. For instance, the expected pass percentage may depend on pass percentages for the corresponding zone for a predetermined number of most recently screened wafers. As an example, the expected pass percentage may be the median of the pass percentages at the same corresponding concentric zone for the previously screened wafers.

For instance, the expected pass percentage for the zone 201 may be the median pass percentage of the zone 201 for the most recent 300 screened wafers. Likewise, the expected pass percentage for the zone 202 may be the median pass percentage of the zone 202 for the most recent 300 screened wafers, the expected pass percentage for the zone 203 may be the median pass percentage of the zone 203 for the most recent 300 screened wafers, the expected pass percentage for the zone 204 may be the median pass percentage of the zone 204 for the most recent 300 screened wafers, and the expected pass percentage for the zone 205 may be the median pass percentage of the zone 205 for the most recent 300 screened wafers Then, the pass percentage for the corresponding zone is compared with the expected pass percentage for the corresponding zone (act 313). As an example, the measured pass percentage of zone 201 of the subject wafer may be compared against the expected pass percentage of the zone 201, the measured pass percentage of zone 202 of the subject wafer may be compared against the expected pass percentage of the zone 202, the measured pass percentage of zone 203 of the subject wafer may be compared against the expected pass percentage of the zone 203, the measured pass percentage of zone 204 of the subject wafer may be compared against the expected pass percentage of the zone 204, and the measured pass percentage of zone 205 of the subject wafer may be compared against the expected pass percentage of the zone 205.

This comparison results in the formulation of a deviation between the measured pass percentage of the corresponding concentric zone and the expected pass percentage of the corresponding concentric zone (act 314). This deviation may be perhaps represented in the form of a number of standard deviations from the expected pass percentage, the standard deviation being based on the pass percentages for the corresponding zone in the previously screen wafers.

Up till this point, the zone-based analysis (act 310) has been described as being performed with pass percentages. However, the analysis may alternatively be performed using fail percentages. In that case, the fail percentage is measured for each zone (act 311), an expected fail percentage is acquired for the corresponding zone (act 312). This expected fail percentage depends on a history of fail percentages for previous dies in a same corresponding zone for previously screened wafers, similar to as described for the expected pass percentage. Then, the fail percentage is compared for the corresponding zone with the expected fail percentage for the corresponding zone (act 313). This comparison results in the formulation of a deviation between the measured fail percentage of the corresponding concentric zone and the expected fail percentage of the corresponding concentric zone (act 314).

Because the zone-based analysis (act 310) may be performed using either pass percentages or fail percentages, method 300 shows the use of "pass/fail" percentages. Furthermore, the term "percentage" is to be interpreted generally as including any information from which a percentage may be calculated. For instance, if the number of die positions in a zone is fixed, the raw number of die that passed (or failed) the test in a given zone may be considered a "pass percentage" (or a "fail percentage"). Furthermore, a decimal representation spanning from 0 to 1 may be used to represent the pass percentage or the fail percentage. For instance, 0.4000 in floating point may be used to represent a percentage of 40 percent. Thus, the term "percentage" should not be construed as requiring that the computing system represent the pass status results for a zone literally in percentage format.

With the zone-based analysis (act 310) being performed for each of the multiple zones, the computing system may then determine whether the subject wafer is a maverick wafer (decision block 321) based on the results of the zone-based analyses. This determination will be described with reference to the example grid mapping 400 of FIG. 4. In the example of FIG. 4, suppose that the deviation from expectation of the zone 202 is 7.5 standard deviations, the deviation of the zone 201 is 3.5 standard deviations, the deviation of zone 203 is 2.8 standard deviations, the deviation of zone 204 is 0.3 standard deviations, and the deviation of zone 205 is 0.2 standard deviations. The deviation is high for zones 201, 202 and 203 because that is where the cluster 120 of failed die is. The deviation for zone 202 is particularly high because the cluster 120 of failed die is largely within the zone 202. On the other hand, the deviations of zones 204 and 205 are relatively low because the failed die are relatively distributed in these zones and do not reflect an abnormality in processing. Thus, the zone-based analysis results in deviation from expected of the pass status for each zone, which may then be used to determine if the subject wafer is a maverick wafer (decision block 321).

In particular, the computing system identifies the subject wafer as a maverick wafer if the deviation for a predetermined number or more of the multiple zones falls outside of a corresponding deviation tolerance for the respective concentric zone. As an example, suppose that this predetermined number is one, such that the subject wafer is identified as a maverick wafer if the deviation for any of the multiple concentric zones falls outside of a corresponding deviation tolerance for the respective concentric zone. Now suppose that the deviation tolerance is six standard deviations. Exactly one of the zones (zone 202 with a deviation of 7.5 standard deviations) has a deviation outside of this deviation tolerance (of 6 standard deviations) ("Yes" in decision block 321), and thus the subject wafer would be identified as a maverick wafer (act 331).

Now suppose that the predetermined number is two, such that the subject wafer is identified as a maverick wafer if the deviation for two or more of the multiple concentric zones falls outside of the corresponding deviation tolerance for the respective zone. Suppose further that the deviation tolerance is 6 standard deviations for each concentric zone. Since only one of the zones (zone 202) has a deviation outside of this deviation tolerance (of 6 standard deviations) ("No" in decision block 321), the subject wafer would not be identified as a maverick wafer (act 332).

As a further example, if the deviation tolerance for each zone were three, and the predetermined number was one, the subject wafer would be identified as a maverick wafer because there are two zones (zone 202 with a deviation of 7.5 standard deviations, and zone 201 with a deviation of 3.5 standard deviations) that have a deviation that falls outside of the deviation tolerance. Likewise, if the deviation tolerance for each zone were three standard deviations, and the predetermined number was two, the subject wafer would be identified as a maverick wafer because there are two zones that have a deviation that falls outside of the deviation tolerance. However, if the deviation tolerance for each zone were three standard deviations, and the predetermined number was three, the subject wafer would not be identified as a maverick wafer because there are only two zones that have a deviation that falls outside of the deviation tolerance.

Once the pass/fail percentage of the subject die is obtained for each zone (in act 311), this data may be added to the history of pass/fail percentages for each zone, so that the history is updated for the next wafer to be evaluated. Thus, the method 300 may repeat with the updated history. Thus, the method 300 is performed with fresh data. Accordingly, if the processes change so that the expectation of pass/fail percentages would change, this is gradually incorporated into the history thus preventing too many wafers from being falsely identified as maverick wafers during a process change.

Figure 5:
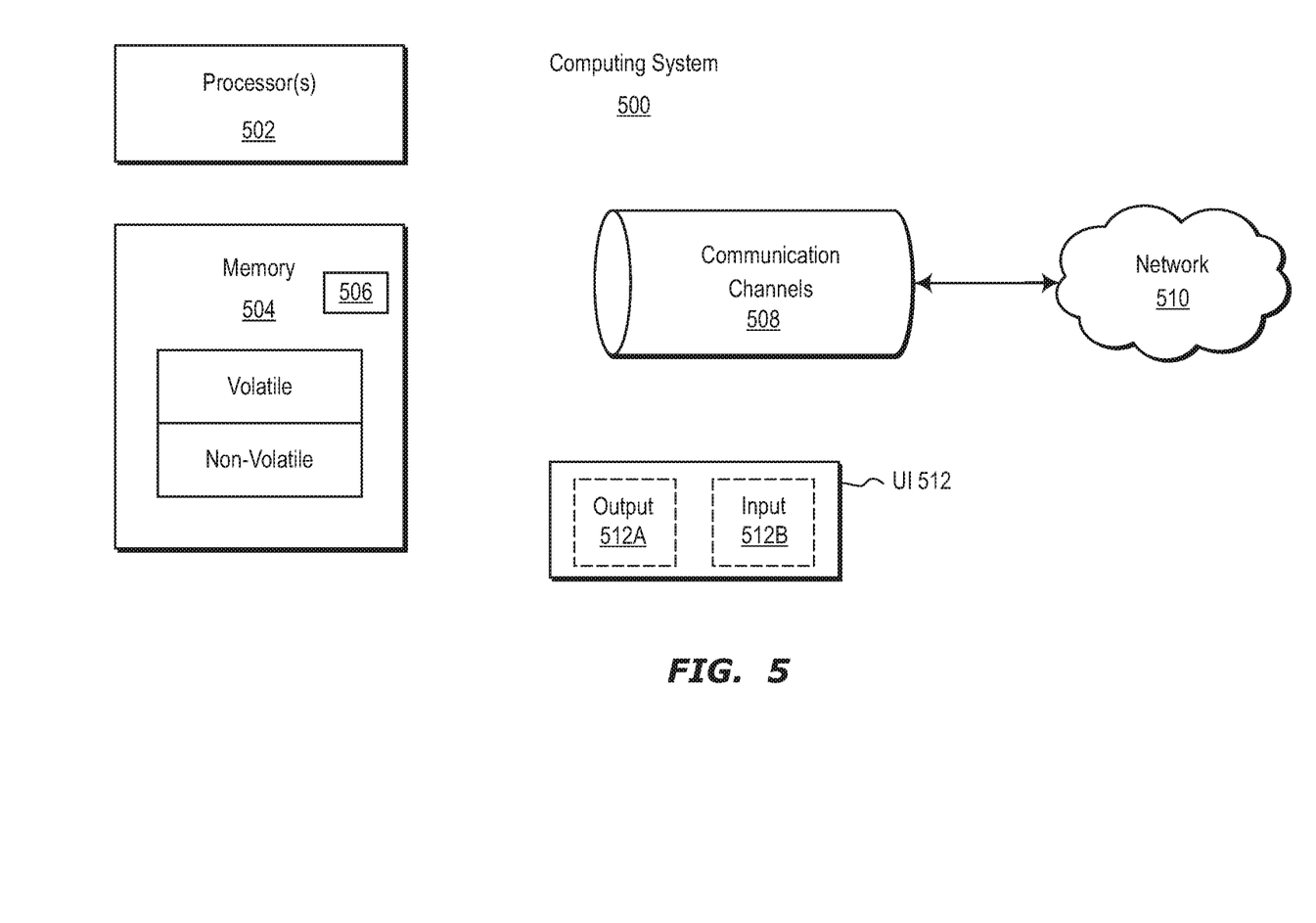
FIG. 5 illustrates a functional block-diagram of a computing system that may be used to perform the method of FIG. 3.

The method 300 may be performed by a computing system, such as the computing system 500 described below with respect to FIG. 5. As illustrated in FIG. 5, in its most basic configuration, a computing system 500 includes at least one hardware processing unit 502 and memory 504. The processing unit 502 includes a general-purpose processor. Although not required, the processing unit 502 may also include a field programmable gate array (FPGA), an application specific integrated circuit (ASIC), or any other specialized circuit. In one embodiment, the memory 504 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 500 also has thereon multiple structures often referred to as an "executable component". For instance, the memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, virtual or augmented reality, holograms and so forth. Examples of input mechanisms 512B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Literal Claim Support Section

Clause 1. A method for automatically performing maverick screening of a semiconductor wafer, the method comprising: acquiring an inspection pass status for each of a plurality of die on a subject wafer, the inspection pass status being whether the corresponding die passed or failed inspection; for each of multiple zones of the subject wafer, comparing a pass/fail percentage of the die within the corresponding zone with an expected pass/fail percentage for the corresponding zone, the expected pass/fail percentage being dependent on a history of pass/fail percentages for previous dies in a same corresponding zone for previously screened wafers, the comparison resulting in a deviation between the measured pass/fail percentage of the corresponding zone and the expected pass/fail percentage of the corresponding zone; and identifying the subject wafer as a maverick wafer if the deviation for a predetermined number or more of the multiple zones falls outside of a corresponding deviation tolerance for the respective zone.

Clause 2. The method in accordance with Clause 1, the multiple zones being multiple concentric zones.

Clause 3. The method in accordance with Clause 2, the predetermined number being one, such that the subject wafer is identified as a maverick wafer if the deviation for any of the multiple concentric zones falls outside of a corresponding deviation tolerance for the respective concentric zone.

Clause 4. The method in accordance with Clause 2, the previously screened wafers being a predetermined number of most recently screened wafers.

Clause 5. The method in accordance with Clause 2, the expected pass/fail percentage for each concentric zone being a median of the pass/fail percentages at the same corresponding concentric zone for the previously screened wafers.

Clause 6. The method in accordance with Clause 2, the deviation tolerance for each of the multiple concentric zones also being depended on a history of pass/fail percentages for previous dies in a same corresponding concentric zone for the previously screened wafers.

Clause 7. The method in accordance with Clause 6, the deviation tolerance for each of the multiple concentric zones being proportional to a standard deviation of the pass/fail percentages for previous dies in a same corresponding concentric zone for the previously screened wafers.

Clause 8. The method in accordance with Clause 2, the plurality of die on the subject wafer being less than all of the die on the subject wafer.

Clause 9. The method in accordance with Clause 2, the plurality of die on the subject wafer being die that are outside of an exclusion zone at a periphery of the subject wafer.

Clause 10. The method in accordance with Clause 9, the plurality of die on the subject wafer being less than all of the die that are outside of the exclusion zone of the subject wafer.

Clause 11. The method in accordance with Clause 2, the multiple concentric zones comprising three or more concentric zones.

Clause 12. The method in accordance with Clause 2, the multiple concentric zones comprising five or more concentric zones.

Clause 13. The method in accordance with Clause 2, the subject wafer being a first subject wafer, the history being a first history, the method further comprising: acquiring an inspection pass status for each of a plurality of die on a second subject wafer; for each of the multiple concentric zones of the second subject wafer, comparing a pass/fail percentage of the die within the corresponding concentric zone with an expected pass/fail percentage for the corresponding concentric zone of the second subject wafer, the expected pass/fail percentage for the corresponding concentric zone of the second subject wafer being dependent on a second history of pass/fail percentages for previous dies in a same corresponding concentric zone for previously screened wafers in the second history, the comparison resulting in a deviation between the measured pass/fail percentage of the corresponding concentric zone of the second subject wafer and the expected pass/fail percentage of the corresponding concentric zone based on the second history; and identifying the second subject wafer as a maverick wafer if the deviation for the predetermined number or more of the multiple concentric zones of the second subject wafer falls outside of a corresponding deviation tolerance for the respective concentric zone.

Clause 14. The method in accordance with Clause 2, further comprising: updating the history to thereby update the expected pass/fail percentage and deviation tolerance for each of the multiple concentric zones for the next subject wafer to be screened.

Clause 15. The method in accordance with Clause 14, the subject wafer being a first subject wafer, the method further comprising: acquiring an inspection pass status for each of a plurality of die on a second subject wafer; for each of the multiple concentric zones of the second subject wafer, comparing a pass/fail percentage of the die within the corresponding concentric zone with the updated expected pass/fail percentage for the corresponding concentric zone of the second subject wafer, resulting in a deviation between the measured pass/fail percentage of the corresponding concentric zone of the second and the expected pass/fail percentage of the corresponding concentric zone based on the updated pass history; and identifying the second subject wafer as a maverick wafer if the deviation for the predetermined number or more of the multiple concentric zones of the second subject wafer falls outside of a corresponding updated deviation tolerance for the respective concentric zone.

Clause 16. The method in accordance with Clause 15, the acquiring of the inspection status comprising performing wafer-level testing of the plurality of die on the subject wafer, the wafer-level testing resulting in the inspection pass status for each of the plurality of die on the subject wafer.

Clause 17. A computer program product comprising one or more computer-readable media having thereon computer-executable instructions that, when executed by one or more processors of a computing system, configure the computing system to automatically performing maverick screening of semiconductor wafers by performing operations comprising: acquiring an inspection pass status for each of a plurality of die on a subject wafer, the inspection pass status being whether the corresponding die passed or failed inspection; for each of multiple zones of the subject wafer, comparing a pass/fail percentage of the die within the corresponding zone with an expected pass/fail percentage for the corresponding zone, the expected pass/fail percentage being dependent on a history of pass/fail percentages for previous dies in a same corresponding zone for previously screened wafers, the comparison resulting in a deviation between the measured pass/fail percentage of the corresponding zone and the expected pass/fail percentage of the corresponding zone; and identifying the subject wafer as a maverick wafer if the deviation for a predetermined number or more of the multiple zones falls outside of a corresponding deviation tolerance for the respective zone.

Clause 18. The computer program product in accordance with Clause 17, the multiple zones being multiple concentric zones.

Clause 19. The computer program product in accordance with Clause 17, the acquiring of the inspection status comprising performing wafer-level testing of the plurality of die on the subject wafer, the wafer-level testing resulting in the inspection pass status for each of the plurality of die on the subject wafer.

Clause 20. A computing system comprising: one or more processors: one or more computer-readable media having thereon computer-executable instructions that, when executed by one or more processors of a computing system, configure the computing system to automatically performing maverick screening of semiconductor wafers by performing operations comprising: acquiring an inspection pass status for each of a plurality of die on a subject wafer, the inspection pass status being whether the corresponding die passed or failed inspection; for each of multiple zones of the subject wafer, comparing a pass/fail percentage of the die within the corresponding zone with an expected pass/fail percentage for the corresponding zone, the expected pass/fail percentage being dependent on a history of pass/fail percentages for previous dies in a same corresponding zone for previously screened wafers, the comparison resulting in a deviation between the measured pass/fail percentage of the corresponding zone and the expected pass/fail percentage of the corresponding zone; and identifying the subject wafer as a maverick wafer if the deviation for a predetermined number or more of the multiple zones falls outside of a corresponding deviation tolerance for the respective zone.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed is:

1. A method for automatically performing maverick screening of a semiconductor wafer, the method comprising:
    acquiring an inspection pass status for each of a plurality of die on a subject wafer, the inspection pass status being whether the corresponding die passed or failed inspection;
    for each of multiple zones of the subject wafer, comparing a pass/fail percentage of the die within the corresponding zone with an expected pass/fail percentage for the corresponding zone, the expected pass/fail percentage being dependent on a history of pass/fail percentages for previous dies in a same corresponding zone for previously screened wafers, the comparison resulting in a deviation between the measured pass/fail percentage of the corresponding zone and the expected pass/fail percentage of the corresponding zone; and
    identifying the subject wafer as a maverick wafer if the deviation for a predetermined number or more of the multiple zones falls outside of a corresponding deviation tolerance for the respective zone.

2. The method in accordance with claim 1, the multiple zones being multiple concentric zones.

3. The method in accordance with claim 2, the predetermined number being one, such that the subject wafer is identified as a maverick wafer if the deviation for any of the multiple concentric zones falls outside of a corresponding deviation tolerance for the respective concentric zone.

4. The method in accordance with claim 2, the previously screened wafers being a predetermined number of most recently screened wafers.

5. The method in accordance with claim 2, the expected pass/fail percentage for each concentric zone being a median of the pass/fail percentages at the same corresponding concentric zone for the previously screened wafers.

6. The method in accordance with claim 2, the deviation tolerance for each of the multiple concentric zones also being depended on a history of pass/fail percentages for previous dies in a same corresponding concentric zone for the previously screened wafers.

7. The method in accordance with claim 6, the deviation tolerance for each of the multiple concentric zones being proportional to a standard deviation of the pass/fail percentages for previous dies in a same corresponding concentric zone for the previously screened wafers.

8. The method in accordance with claim 2, the plurality of die on the subject wafer being less than all of the die on the subject wafer.

9. The method in accordance with claim 2, the plurality of die on the subject wafer being die that are outside of an exclusion zone at a periphery of the subject wafer.

10. The method in accordance with claim 9, the plurality of die on the subject wafer being less than all of the die that are outside of the exclusion zone of the subject wafer.

11. The method in accordance with claim 2, the multiple concentric zones comprising three or more concentric zones.

12. The method in accordance with claim 2, the multiple concentric zones comprising five or more concentric zones.

13. The method in accordance with claim 2, the subject wafer being a first subject wafer, the history being a first history, the method further comprising:
    acquiring an inspection pass status for each of a plurality of die on a second subject wafer;
    for each of the multiple concentric zones of the second subject wafer, comparing a pass/fail percentage of the die within the corresponding concentric zone with an expected pass/fail percentage for the corresponding concentric zone of the second subject wafer, the expected pass/fail percentage for the corresponding concentric zone of the second subject wafer being dependent on a second history of pass/fail percentages for previous dies in a same corresponding concentric zone for previously screened wafers in the second history, the comparison resulting in a deviation between the measured pass/fail percentage of the corresponding concentric zone of the second subject wafer and the expected pass/fail percentage of the corresponding concentric zone based on the second history; and
    identifying the second subject wafer as a maverick wafer if the deviation for the predetermined number or more of the multiple concentric zones of the second subject wafer falls outside of a corresponding deviation tolerance for the respective concentric zone.

14. The method in accordance with claim 2, further comprising:
    updating the history to thereby update the expected pass/fail percentage and deviation tolerance for each of the multiple concentric zones for the next subject wafer to be screened.

15. The method in accordance with claim 14, the subject wafer being a first subject wafer, the method further comprising:
    acquiring an inspection pass status for each of a plurality of die on a second subject wafer;
    for each of the multiple concentric zones of the second subject wafer, comparing a pass/fail percentage of the die within the corresponding concentric zone with the updated expected pass/fail percentage for the corresponding concentric zone of the second subject wafer, resulting in a deviation between the measured pass/fail percentage of the corresponding concentric zone of the second and the expected pass/fail percentage of the corresponding concentric zone based on the updated pass history; and
    identifying the second subject wafer as a maverick wafer if the deviation for the predetermined number or more of the multiple concentric zones of the second subject wafer falls outside of a corresponding updated deviation tolerance for the respective concentric zone.

16. The method in accordance with claim 15, the acquiring of the inspection status comprising performing wafer-level testing of the plurality of die on the subject wafer, the wafer-level testing resulting in the inspection pass status for each of the plurality of die on the subject wafer.

17. A computer program product comprising one or more computer-readable media having thereon computer-executable instructions that, when executed by one or more processors of a computing system, configure the computing system to automatically performing maverick screening of semiconductor wafers by performing operations comprising:

acquiring an inspection pass status for each of a plurality of die on a subject wafer, the inspection pass status being whether the corresponding die passed or failed inspection;

for each of multiple zones of the subject wafer, comparing a pass/fail percentage of the die within the corresponding zone with an expected pass/fail percentage for the corresponding zone, the expected pass/fail percentage being dependent on a history of pass/fail percentages for previous dies in a same corresponding zone for previously screened wafers, the comparison resulting in a deviation between the measured pass/fail percentage of the corresponding zone and the expected pass/fail percentage of the corresponding zone; and identifying the subject wafer as a maverick wafer if the deviation for a predetermined number or more of the multiple zones falls outside of a corresponding deviation tolerance for the respective zone.

18. The computer program product in accordance with claim 17, the multiple zones being multiple concentric zones.

19. The computer program product in accordance with claim 17, the acquiring of the inspection status comprising performing wafer-level testing of the plurality of die on the subject wafer, the wafer-level testing resulting in the inspection pass status for each of the plurality of die on the subject wafer.

20. A computing system comprising:

one or more processors:

one or more computer-readable media having thereon computer-executable instructions that, when executed by one or more processors of a computing system, configure the computing system to automatically performing maverick screening of semiconductor wafers by performing operations comprising:

acquiring an inspection pass status for each of a plurality of die on a subject wafer, the inspection pass status being whether the corresponding die passed or failed inspection;

for each of multiple zones of the subject wafer, comparing a pass/fail percentage of the die within the corresponding zone with an expected pass/fail percentage for the corresponding zone, the expected pass/fail percentage being dependent on a history of pass/fail percentages for previous dies in a same corresponding zone for previously screened wafers, the comparison resulting in a deviation between the measured pass/fail percentage of the corresponding zone and the expected pass/fail percentage of the corresponding zone; and identifying the subject wafer as a maverick wafer if the deviation for a predetermined number or more of the multiple zones falls outside of a corresponding deviation tolerance for the respective zone.

\* \* \* \* \*